INVENTORS
Friedrich BÖTTGER
Paul CÜPPERS
By

Richards & Geier their ATTORNEYS

_United States Patent Office_

3,448,656
Patented June 10, 1969

3,448,656
TOOL SLIDES FOR LATHES
Friedrich Böttger, Erkelenz, Rhineland, and Paul Cüppers, Solingen-Wald, Germany, assignors to Maschinenfabrik Froriep G.m.b.H., Rheydt, Rhineland, Germany, a German firm
Filed May 10, 1966, Ser. No. 549,001
Claims priority, application Germany, May 12, 1965, M 65,205
Int. Cl. B23c 1/12, 3/00, 7/00
U.S. Cl. 90—17                                   2 Claims

ABSTRACT OF THE DISCLOSURE

A machining unit for lathes and other machine tools has a slide movable upon horizontal guides and carrying vertical guides for a sliding member. This sliding member carries a driving spindle which is inclined relatively to a tool spindle carried by a casing. The casing can be rotated about the axis of the driving spindle to set the tool spindle in two perpendicular directions.

---

This invention relates to a machining unit having the shape of a slide or the like which is movable along a guide; the invention refers more particularly to a slide having a tool spindle for lathes, particularly lathes with horizontal face plates.

When a workpiece is being machined, it is practically always necessary to carry out various different machining operations; by way of example, besides turning it may be necessary to bore holes, mill surfaces, etc., usually in several different directions. Often it is necessary to transport a workpiece from one machine, such as a lathe, to another one. This requires additional time and work and is particularly disadvantageous when large workpieces are involved, more so when the additional treatments are comparatively small.

The treatment of a workpiece upon different machines is very unsatisfactory in view of the necessity of clamping it and also as far as operational precision is concerned. For this reason as well, in view of present day high requirements for the precision of workpieces, it is most advantageous, and often unavoidable, that different treating operations be carried out upon the same machine; the workpiece is then completed in one clamping and it is necessary to arrange it so that surfaces which have been turned, for example, be available for boring, milling, etc.

An important requirement is that such operations must be completed within the shortest possible time and that they be carried out automatically, that is, without intervention or continuous supervision by skilled operators.

An object of the present invention is the provision of a machining unit having the form of a slide or the like, the use of which in a machine tool, namely a lathe, particularly a vertical lathe, will help to overcome the difficulties created by the above-mentioned requirements.

Other objects of the present invention will become apparent in the course of the following specification.

In the accomplishment of the objectives of the present invention it was found advisable to provide a tool spindle of a machining unit which is adjustable in two perpendicular directions by the rotation of a casing containing the spindle along with its support about the axis of a driving spindle which is inclined relatively to the tool spindle. This provides the possibility to carry out in a simple way and with small expenditure, namely, with the use of a single tool spindle, a variety of operations in two coordinate directions, such as boring, milling, polishing, etc., whereby the switching from one direction to the other takes place quickly and without any difficulties.

In the machining unit of the present invention the turning of the casing for the tool spindle can be carried out in a number of different ways, even by hand. However, according to a preferred embodiment of the invention, the tool spindle is held within its casing by a brake, lock or the like, while the casing is rotated by the driving spindle. This construction provides several advantages. The use of additional driving means, such as gears, worm drives, etc. is eliminated, so that constructional costs are diminished and in addition there is a saving in space. The blocking of the tool spindle relatively to its casing can be accomplished very simply by an electromagnetic or a hydraulically operated brake. This construction makes it also easily possible to incorporate the turning of the tool spindle casing into an automatic machining operation.

Remotely controlled means are advantageously used to fix the tool spindle casing relatively to the part which carries it. It is possible to provide a hydraulically operated clamping ring which when pressure is low holds the casing upon a support permitting rotary movement at its guiding surface or guide and which provides a firm connection therewith when pressure is high.

A fixing pin, possibly combined with a fixed stop, can be used to positively fix the working or end positions of the tool spindle casing; by way of example, the pin is inserted by spring pressure into a fixing bushing and can be pulled out by hydraulic or electromagnetic forces.

It is advantageous to provide automatic operating means to terminate an operation when the tool spindle is guided from one position to the other position, whereby the releasing impulse can be incorporated into a stored program. By way of example, the following steps then take place:

Withdrawal of the fixing pin and release of the clamping of the tool spindle casing, actuating the brake to hold the tool spindle in the casing, switching on the drive spindle to rotate the casing and switching it off when a new working position has been reached (for example, by striking a switch serving as a stop), fixing, clamping and releasing the blocking of the tool spindle.

The drive spindle is preferably rotated by the shaft of a drive which can have several steps or be adjustable without steps in order to be applicable to the greatest variety of operational requirements. The construction can consist in that the drive spindle is arranged at the end of a wheel case and that this end part of the wheel case constitutes the guide or the supporting surface for the tool spindle casing. This provides a compact and stable construction.

An embodiment of the present invention which is particularly suitable for a lathe with a horizontal face plate, consists in that the rotary tool spindle casing is mounted upon a vertically shiftable slidable member or the like, the guides of which are located upon a slide part which is horizontally adjustable in at least one direction. This construction provides advantageous conditions for the range of operations and feed movements. The vertically movable slidable member can be constructed as a wheel box and can carry a driving motor. A most effective construction can be provided when a lower part of the slide which is movable upon horizontally extending transverse guides, carries an upper part which is movable horizontally perpendicularly thereto, the slidable member holding the rotary tool spindle casing being vertically adjustable upon said upper part.

In accordance with a preferred construction of the present invention the exchange of tools is carried out quickly and without complications in that the tool spindle casing is provided with a packing or chuck which is tensioned and released by a rotary movement in a manner known per se, whereby the rotation of one packing portion takes place by the tool spindle itself which is connected with it, while a brake, lock or the like is used to hold the other packing portion. This results in a particularly advantageous simple construction which provides at the same time all possibilities for an automatic operation.

It is particularly advantageous to use the known roll coupling as the clamping chuck. This provides for machines of short length a precise centering and a forceful stop without positive driving and it can be used along with a normal universal spindle nose.

To hold firmly that part of the packing or chuck which must not move during tensioning or releasing, such as a tensioning ring or the like, it is advisable to provide a shoe brake the jaws of which are movable in the axial direction, being held by springs, so that the jaws can follow the axial movement of the part which is being held.

According to a further feature of the present invention a braking or locking member is provided, namely a pair of brake jaws which engage the packing portion to be held firmly, said member being movable at least to one side in the circumferential direction against a yieldable resistance. This resistance may consist, for example, of a tangentially directed spring, a package of springs or some other compressible body. It is also possible to provide a friction coupling or the like. It can serve as a safety device if, for example, a higher torque is exerted upon the part to be held at the end of the tensioning operation. Furthermore, the present invention provides that the movement of the braking or locking member in the circumferential direction actuates a switching or actuating member. This arrangement is particularly suitable to use the movement occurring at the end of the tensioning procedure to stop the corresponding drive.

Similar arrangements can be provided for the reverse direction with which the releasing is concerned. There, for example, a spring package constituting a yieldable resistance is so set or pretensioned, that it absorbs the forces normally developed during releasing without being compressed, although it will yield when the releasing resistance becomes too great, for example, due to binding. The movement which then takes place can be used again for actuating a switch to hold the tool spindle.

In accordance with a further feature of the present invention the machining unit can be combined with a tool container, a device for exchanging tools, and the like, whereby the exchange of tools can proceed entirely automatically in the described holding device.

The present invention makes it possible to carry out completely automatically different treating operations, such as boring, milling and the like in two coordinates according to a predetermined program numerically, or by being steered through cams, whereby, by way of example, these operational treatments can follow the turning of a workpiece which remains fixed, or can be combined with it in some other way.

The invention will appear more clearly from the following detailed description when taken in connection with the accompanying drawings showing by way of example, a preferred embodiment of the inventive idea.

In the drawings:

FIGURE 2 is a side view of the lathe shown in FIG. 1a.

Figure 1:
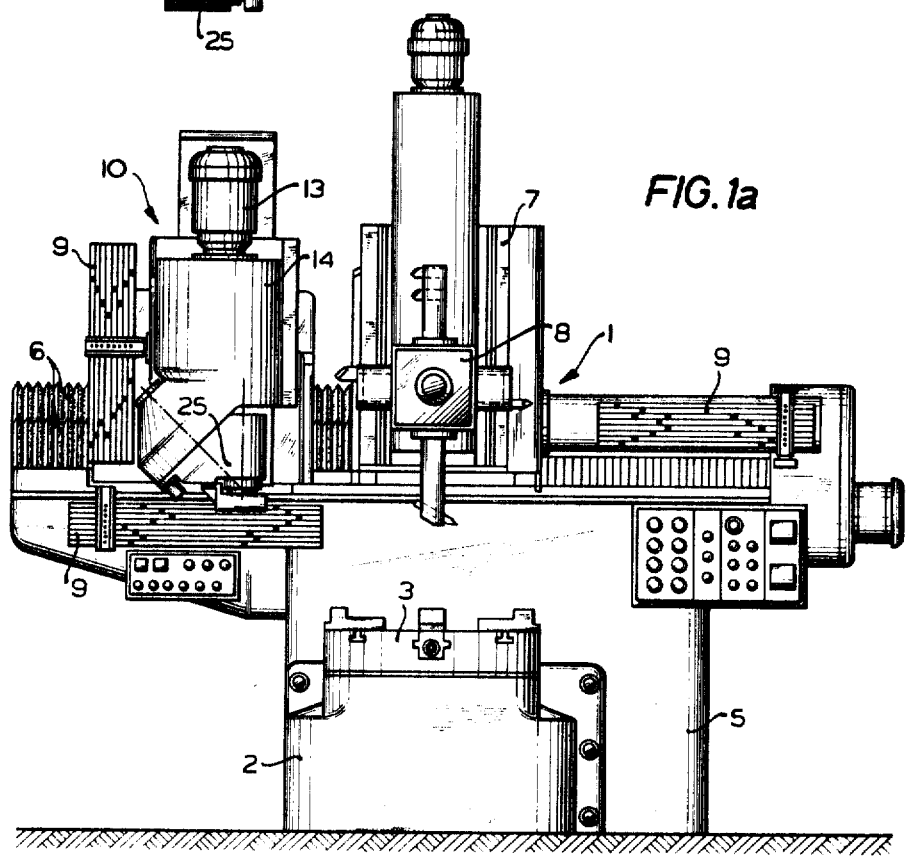
FIGURE 1a is a front view of a lathe provided with the machining unit of the present invention.
FIGURE 1b is a detail view of a part of the machining unit with the spindle being in a different position.
Figure 2:
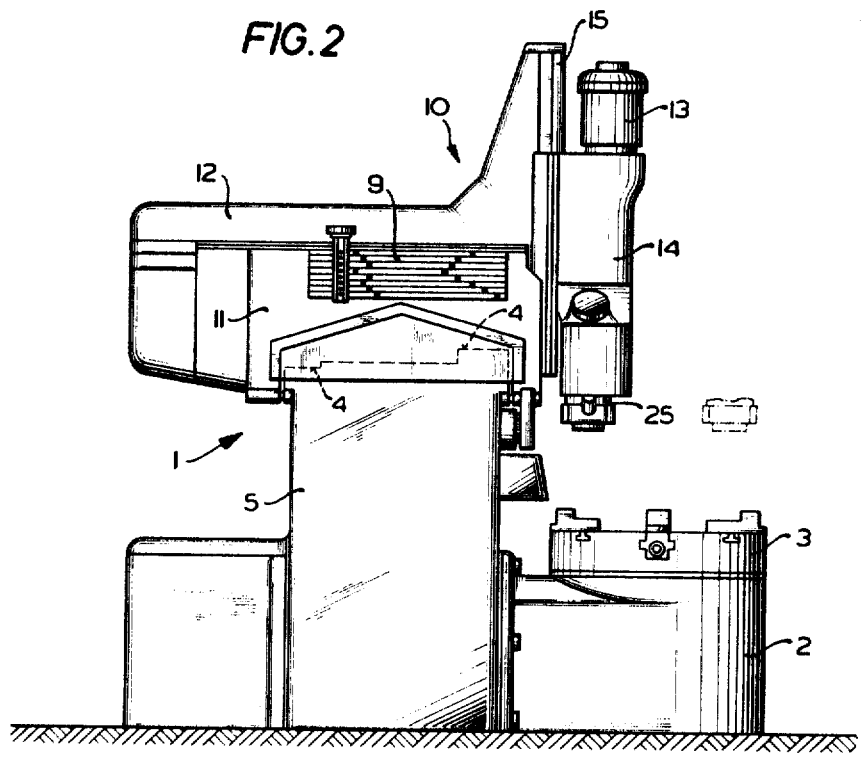

FIGS. 1a and 2 illustrates an advantageous manner of combining the machining unit of the present invention with a lathe having a horizontal face plate; they show a one stand lathe 1 having a face plate 3 which is supported upon a pedestal 2 and which can be driven with different speeds and fixed in different locations. As a special feature this lathe is provided with horizontally extending transverse guides 4 located upon the upper side of a stand or support 5 and protected by folded bellows 6. Two machining units are transversely movable upon the guides 4, namely a rotary support 7 with a revolving head 8 and a unit 10 constructed in accordance with the principles of the present invention. The unit 10 consists of a lower slide part 11 which slides upon the guides 4 (FIG. 2), an upper part or beam 12 which is also movable horizontally at right angles to the guides 4 and a sliding member 14 provided with a driving motor 13 and adjustable vertically in the guides 15 of the beam 12.

FIG. 2 shows by broken lines a further outer position of the sliding member 14.

Cam means 9 are used for regulating the movements of the various parts, for releasing the switching operations, etc.

The upper portion of the sliding member 14 includes a wheel drive (not shown) which by way of example, may have nine steps and be provided with magnetic gear couplings remotely actuated in a known manner.

Figure 3:
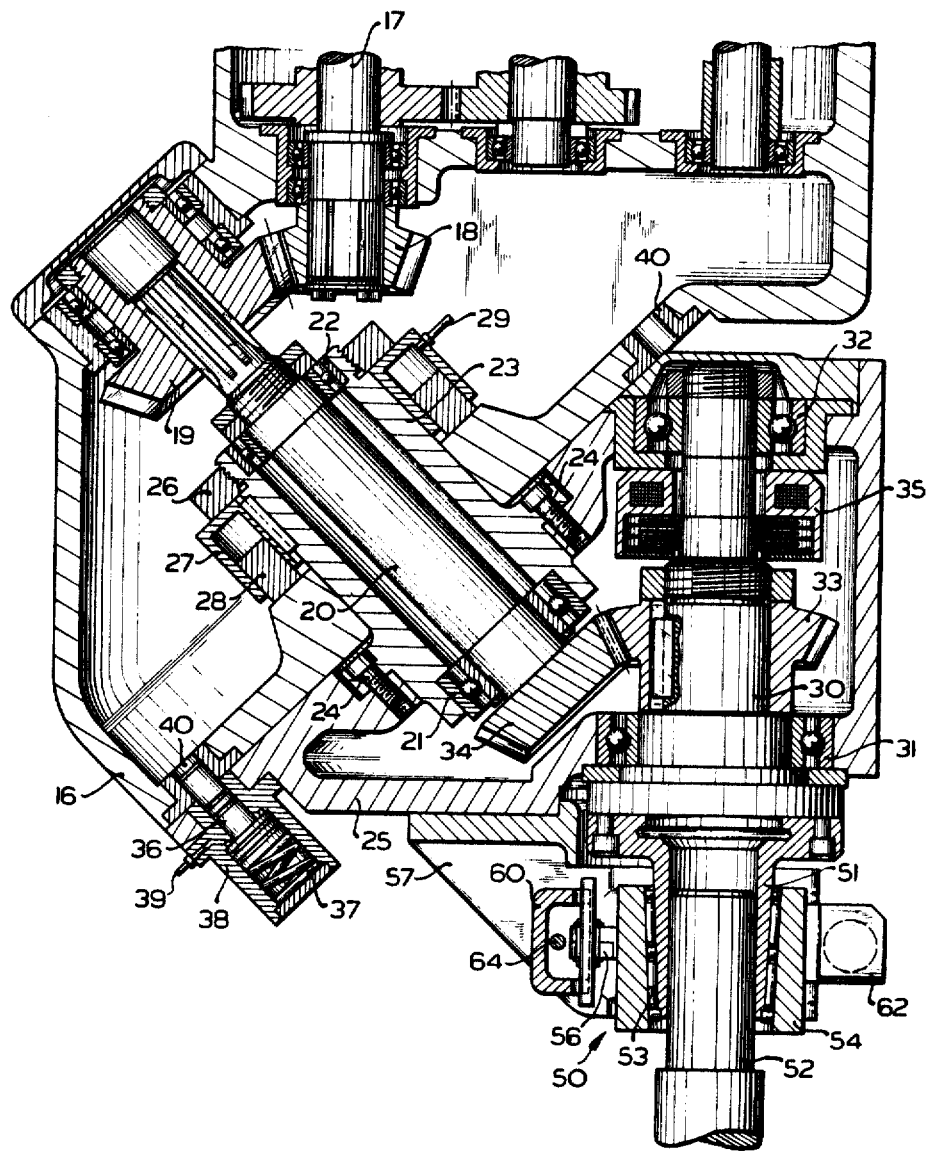
FIGURE 3 is a section through the unit shown in FIGS. 1a, 1b and 2 on an enlarged scale.

FIG. 3 shows in section the lower portion of the casing 16 of the sliding members; it also shows the outgoing shaft 17 of the wheel drive. The rotation of the shaft 17 is transmitted by meshing cone gears 18 and 19 to a driving spindle 20 which is inclined to the extent of 45 degrees relatively to the vertical. The driving spindle 20 is supported by roller bearings 21, 22 in a sleeve 23 which is connected by screws 24 with a casing 25. The casing 25 has a surface extending transversely to the axis of the driving spindle 20 at an angle of 45 degrees relatively to the vertical and engaging a corresponding counter-surface of the casing 16. The casing 25 is rotatable about the axis of the spindle 20. A hydraulically operated clamping device 27 having an annular piston 28 is located between a screw 26 threaded upon the sleeve 23 and the casing 16. The clamping device 27 receives the pressure medium through a conduit 29. The hydraulic pressure which is thus exerted can be light, so that the casing 25 will be lightly pressed against the casing 16 and can rotate relatively thereto, or the pressure can be so high that the two casings will be firmly interconnected.

A tool spindle 30 supported by roll bearings 31 and 32 is mounted in the casing 25 and is driven by the spindle 20 through meshing cone gears 33 and 34. The tool spindle 30 can be blocked relatively to the casing 25 by an electromagnetic brake 35 firmly connected and rotatable along with the casing 25. When the blocking takes place, the casing 25 can be easily rotated about the axis of the spindle 20 by rotating the spindle 20 itself. This is carried out from the main drive through the outgoing shaft 17. Then the tool spindle 30 will not occupy any more its vertical position shown in FIG. 3 and will be able to assume a horizontal axis position. This is indicated in FIG. 1b, wherein the axes of the driving spindle and the tool spindle are indicated by broken lines.

A slidable fixing pin 36 is used to maintain the casing 25 in a precise position in all operational locations; the pin 36 is pressed by a spring 37 into one of sleeves 40 which are provided at the corresponding locations. The rear end of the pin 36 has the shape of a piston which slides in a cylinder 38. A conduit 39 supplies a pressure medium to the cylinder 38 and then the pin 36 can be moved out of a sleeve 40 so as to release the casing 25.

Let it be assumed that the tool spindle 30 has completed its operation in the vertical position shown in FIGS. 1a and 3 and should now carry out operations with a horizontal spindle; for that purpose the casing 25 is turned. All operations required for this purpose can be actuated automatically with known means which are not shown individually, whereby the entire procedure is carried out automatically upon release of an impulse. Then current is transmitted to the electromagnetic brake 35, so that the tool spindle 30 is blocked. Pressure means are transmitted through the conduit 39, so that the pin 36 is withdrawn. At the same time the clamping device 27 is switched to lower pressure. The main drive with the shaft 17 is now switched on, so that the driving spindle 20 will rotate the casing 25 with the tool spindle 30. When the end location is reached a switch (not shown) is actuated which stops the main drive and operates means withdrawing the pressure medium from the casing 38, so that the pin 36 will be pressed by the spring 37 into the corresponding sleeve 40; pressure in the device 27 is increased again so that the casing 25 is clamped; finally the current to the brake 35 is switched off and the tool spindle 30 is released.

A roll coupling 50 is provided as the clamping chuck for the tools. Roll couplings of this type are well known in prior art and are described in detail, for example, in an article by Walter Scharm entitled "Roll Coupling As Precision Chucking Tool" published in 1961 in the German magazine "Werkstatt und Betrieb." For this reason, the roll coupling 50 is not described in detail herein. The chuck body 51 has a cylindrical bore for receiving the tool shaft 52 and also has a conical outer surface; several rows of crossed rollers 53, i.e. rollers extending at an inclination to the chuck axis, are held in a cage and run upon the conical surface. The rollers 53 are enclosed by a tensioning ring 54 having corresponding inner conical surfaces. The tensioning takes place by a relative rotation between the chuck body 51 and the tensioning ring 54. Then the chuck body 51 becomes subjected to an upsetting which results in a central clamping of the tool shaft. It is released by the relative rotation of members 51 and 54 in the opposite direction.

Figure 5:
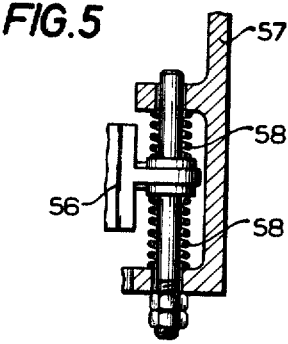
FIGURE 5 is a detail sectional view of a part of the tool holding device.

The chuck body 51 is rotated by the tool spindle 30 for tool holding and releasing purposes, whereby the spindle 30 is actuated by the drive through the driving spindle 20, while the tensioning ring 54 is held firmly. A shoe brake 55 is provided for that purpose; it has shoes 56 enclosing the tensioning ring. The brake 55 is suspended in a support 57 and is axially movable therein. The support 57 is fixed to the casing 25. The shoes 56 of the brake are supported in the axial direction between springs 58 mounted in the support 57 (FIG. 5).

Ends of the brake shoes 56 are interconnected at one side by an articulated pin 59 which extends through a slot 61 in a bridge 60. An actuating device 62 for the brake is located between other ends of the brake shoes 56. In the example illustrated the device 62 operates hydraulically, in that a piston connected with one shoe is movable in a cylinder connected with the other shoe and adapted to receive the pressure medium through a conduit 63.

The bridge 60 is firmly connected with a switching pin 64 which is guided in bore holes of the support 57. When the pin 64 is moved, its ends can actuate electrical switches 65 and 66, respectively. Plate spring packages 67 and 68 enclose the pin 64 and are located between side surfaces of the bridge 60 and opposed surfaces of the support 57. These springs normally hold the pin 59 in a central position and provide yieldable resistances to the circumferential movements of the brake shoes 56 in one or the other direction.

Figure 4:
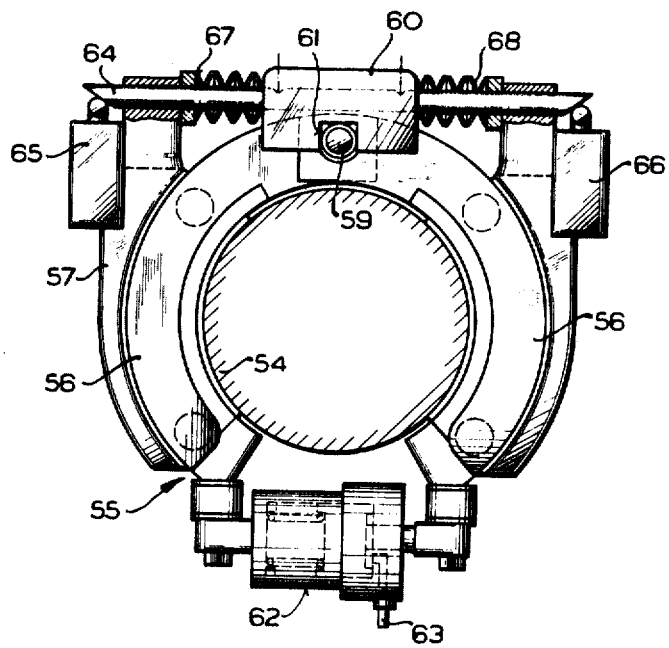
FIGURE 4 is a top view showing a part of the tool holding device on an enlarged scale.

The mounting of a tool takes place as follows:

The tool shaft 52 is introduced into the chuck body 51 and then the pressure medium is introduced into the actuating device 62 for the brake 55, so that the brake shoes engage the tensioning ring 54 and hold it firmly. Then the tool spindle 30 is rotated to the left by the main drive through the driving shaft 20. The chuck body 51 is then also rotated relatively to the firmly held tensioning ring 54, so that the tool shaft 52 is clamped. When a tensioning torque is reached which had been set by an adjustment or pre-tensioning of the spring package 67, the spring package is compressed, so that the brake shoes 56 are moved counterclockwise along with the ring 54; the bridge 60 along with the pin 64 are moved to the left (looking in the direction of FIG. 4). The pin 64 then actuates the switch 65 which switches off the spindle drive and thus terminates the fitting operation; at the same time it provides an outflow of the pressure medium from the actuating device 62, so that the jaws 56 open and move out of engagement with the tensioning ring 54. The pin 64, the bridge 60 and the brake shoes 56 return to their central position. The tool is now fixed in place and can be used for the desired operations.

The tool is released in a similar manner. By actuating the brake 55 the tensioning ring is fixed again and then a righthand movement is imparted to the tool spindle, so that the tensioning is released. A time relay (not shown) is used to terminate the releasing operation by stopping the tool spindle and opening the brake.

The spring package is so adjusted that the spring force is sufficiently strong to absorb a normal torque taking place during the releasing. If in an exceptional case the releasing resistance becomes excessively great, for example, due to corrosive binding, the spring package 68 will yield, the pin 64 will move to the right (looking in the direction of FIG. 4) and will actuate the switch 66, which will stop the tool spindle 30 and will switch on a lamp, for example. The switching connections can be made in such manner that thereupon the tool spindle can not be switched on any more, or that the continuing program will be interrupted. This assures that further operations can be carried out only after the source of disturbances has been removed.

It is apparent that the unit of the present invention makes possible the insertion or the mounting of a tool container or the like in a particularly advantageous manner, so that the exchange of tools can also take place automatically.

It is further apparent that the example described above has been given solely by way of illustration and not by way of limitation and that it is subject to many variations and modifications within the scope of the present invention. All such variations and modifications are to be included within the scope of the present invention.

What is claimed is:

1. In a machining unit for a machine tool, spaced horizontally extending guides, a slide movable horizontally in at least one direction upon said guides, vertically extending guides carried by said slide, a sliding member slidable upon said vertically extending guides, a driving spindle carried by said sliding member, a tool spindle, bearings carrying said tool spindle, a casing carrying said bearings and said tool spindle, said driving spindle being drivingly engaged with and being inclined relatively to said tool spindle, and means rotating said casing about the axis of said driving spindle to set said tool spindle in two perpendicular directions, said means rotating said casing including a remotely controlled braking device for fixing said tool spindle relatively to said casing, whereby rotation of said drive spindle will cause said tool spindle and said casing to rotate.

2. A machining unit in accordance with claim 1, comprising a remotely controlled clamping device for fixing said casing relatively to said sliding member.

References Cited

UNITED STATES PATENTS

| | | | |
|---|---|---|---|
| 1,004,620 | 10/1911 | Berold | 90—17 |
| 2,063,344 | 12/1936 | Schneider | 279—72 |
| 2,491,859 | 12/1949 | Hijmans | 77—25 |
| 3,023,677 | 3/1962 | Charlat | 77—25 |

FOREIGN PATENTS

| | | |
|---|---|---|
| 368,843 | 2/1923 | Germany. |
| 1,304,586 | 10/1960 | France. |

ANDREW R. JUHASZ, *Primary Examiner.*

G. WEIDENFELD, *Assistant Examiner.*

U.S. Cl. X.R.

90—11